United States Patent
Lee et al.

(10) Patent No.: US 9,212,674 B2
(45) Date of Patent: Dec. 15, 2015

(54) BRIDGING MECHANISM FOR CONNECTING A SUPPORTING TUBE AND A HOLDER AND ANTENNA DEVICE THEREWITH

(71) Applicant: Wistron NeWeb Corporation, Hsinchu (TW)

(72) Inventors: Ming-Chan Lee, Hsinchu (TW); Lan-Chun Yang, Hsinchu (TW); Hung-Yuan Lin, Hsinchu (TW); San-Yi Kuo, Hsinchu (TW); Yu-Fu Ku, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 66 days.

(21) Appl. No.: 13/740,279

(22) Filed: Jan. 14, 2013

(65) Prior Publication Data

US 2014/0084127 A1    Mar. 27, 2014

(30) Foreign Application Priority Data

Sep. 24, 2012   (TW) .............................. 101218428 U (51) Int. Cl.
| | | |
|---|---|---|
| *F16B 2/18* | (2006.01) | |
| *F16B 2/10* | (2006.01) | |
| *H01Q 1/12* | (2006.01) | |
| *H01Q 1/27* | (2006.01) | |
| *F16B 7/10* | (2006.01) | |
| *F16B 2/14* | (2006.01) | |

(52) U.S. Cl.
CPC . *F16B 2/10* (2013.01); *F16B 2/185* (2013.01); *F16B 7/105* (2013.01); *H01Q 1/12* (2013.01); *H01Q 1/273* (2013.01); *F16B 2/14* (2013.01); *F16B 2/18* (2013.01); *Y10T 403/595* (2013.01)

(58) Field of Classification Search
USPC .............. 248/222.51, 222.52, 222.13, 228.2, 248/230.2, 231.31, 316.2; 403/324, 321, 403/322.1, 322.4, 109.5, DIG. 8
See application file for complete search history.

(56) References Cited

U.S. PATENT DOCUMENTS

| | | | | |
|---|---|---|---|---|
| 419,379 | A | * | 1/1890 | Talbot ...................... 248/229.15 |
| 2,006,525 | A | * | 7/1935 | Thal .............................. 411/80.5 |
| 3,279,518 | A | * | 10/1966 | Bollinger ....................... 411/166 |
| 4,669,340 | A | * | 6/1987 | Igarashi .......................... 81/416 |
| 4,767,131 | A | * | 8/1988 | Springer et al. ........... 280/304.1 |
| 4,786,022 | A | * | 11/1988 | Grieshaber ................ 248/287.1 |

(Continued)

FOREIGN PATENT DOCUMENTS

KR     2007021681 A  *  2/2007  ............. A47B 33/00

*Primary Examiner* — Alfred J Wujciak
(74) *Attorney, Agent, or Firm* — Winston Hsu; Scott Margo (57) ABSTRACT

A bridging mechanism, for connecting a supporting tube and a holder, includes at least one positioning portion, a bridging member, a connecting member, a handle and at least one positioning structure. The at least one positioning portion is formed on the supporting tube. The bridging member is used for bridging the supporting tube. The connecting member extends from the bridging member for connecting the holder. The handle is pivoted to the bridging member for rotably pressing the supporting tube when the supporting tube is bridged to the bridging member, so as to abut the supporting tube against the bridging member. The at least one positioning structure is formed on the handle. The at least one positioning structure simultaneously rotates with the handle for wedging with the at least one positioning portion when the handle rotates to press the supporting tube to position the bridging member on the supporting tube.

11 Claims, 9 Drawing Sheets

(56) References Cited

U.S. PATENT DOCUMENTS

| | | | |
|---|---|---|---|
| 6,113,042 A * | 9/2000 | Welsch et al. | 248/218.4 |
| 6,527,473 B2 * | 3/2003 | Chen | 403/374.1 |
| 8,074,583 B2 * | 12/2011 | Lee | 108/147.13 |
| 8,257,231 B2 * | 9/2012 | Bingham et al. | 482/57 |
| 8,590,849 B2 * | 11/2013 | Melic | 248/200.1 |

* cited by examiner

BRIDGING MECHANISM FOR CONNECTING A SUPPORTING TUBE AND A HOLDER AND ANTENNA DEVICE THEREWITH

BACKGROUND OF THE INVENTION

1. Field of the Invention

The present invention relates to a bridging mechanism and an antenna device therewith, and more particularly, to a bridging mechanism for a supporting tube and a holder with easy assembly and an antenna device therewith.

2. Description of the Prior Art

A conventional satellite antenna device includes a holder, a supporting tube and a bridging mechanism. The supporting tube is used for supporting the holder, and the holder is used for holding a satellite antenna disk, such that the satellite antenna disk is capable of receiving satellite signals. The bridging mechanism is used for connecting and fixing the holder and the supporting tube, such that the supporting tube can support the holder stably. Conventionally, the bridging mechanism is combined with the holder and the supporting tube in a screwing and a riveting manner, respectively. The aforesaid design requires additional components such as screws and results in complex assembly process, and thus it is not convenient for a user to install and use.

SUMMARY OF THE INVENTION

The present invention provides a bridging mechanism for a supporting tube and a holder with easy assembly and an antenna device therewith for solving above drawbacks.

According to an embodiment of the present invention, a bridging mechanism includes at least one positioning portion, a bridging member, a connecting member, a handle and at least one positioning structure. The at least one positioning portion is formed on the supporting tube. The bridging member is for bridging the supporting tube. The handle is pivoted to the bridging member for rotably pressing the supporting tube when the supporting tube is bridged to the bridging member, so as to abut the supporting tube against the bridging member. The at least one positioning structure is formed on the handle, and the at least one positioning structure simultaneously rotates with the handle for wedging with the at least one positioning portion when the handle rotates to press the supporting tube, so as to position the bridging member on the supporting tube.

According to another embodiment of the present invention, the handle includes a pivotal portion, a pressing cam and a handle portion. The pivotal portion is pivoted to the bridging member. The pressing cam protrudes from the pivotal portion. The handle portion is connected to the pivotal portion, and the handle portion is for rotating the pivotal portion to make the pressing cam press the supporting tube when the bridging member bridges the supporting tube.

According to another embodiment of the present invention, the bridging member includes a first edge plate and a second edge plate opposite to the first edge plate, and a pivotal hole is formed on the pivotal portion. The bridging mechanism further includes a pivot shaft member disposed through the pivotal hole on the pivotal portion for pivoting the pivotal portion to the first edge plate and the second edge plate.

According to another embodiment of the present invention, a constraining hole is formed on the first edge plate of the bridging member, and a constraining structure is formed on an end of the pivot shaft member for cooperating with the constraining hole, so as to constrain the pivot shaft member from rotating relative to the bridging member.

According to another embodiment of the present invention, the constraining structure is a substantially rectangular structure, and the constraining hole is a substantially rectangular hole.

According to another embodiment of the present invention, the bridging mechanism further includes a first constraining member and a second constraining member. The first constraining member is disposed on an end of the pivot shaft member for abutting against the first edge plate of the bridging member. The second constraining member is disposed on the other end of the pivot shaft member for abutting against the second edge plate, and the second constraining member and the first constraining member are cooperatively further for constraining the pivot shaft member from being separate from the bridging member.

According to another embodiment of the present invention, the first constraining member and the pivot shaft member are integrally formed, a thread portion is formed on the other end of the pivot shaft member, and the second constraining member is a nut movably screwed on the thread portion.

According to another embodiment of the present invention, the bridging mechanism further includes a first bushing and a second bushing. The first bushing sheathes on the pivot shaft member and abuts against the pivotal portion of the handle and the first edge plate of the bridging member. The second bushing sheathes on the pivot shaft member and abuts against the pivotal portion of the handle and the second edge plate of the bridging member.

According to another embodiment of the present invention, the at least one positioning portion is a positioning hole, and the at least one positioning structure is a positioning post.

According to another embodiment of the present invention, the bridging member is a substantially rectangular structure.

According to another embodiment of the present invention, the bridging member includes a stopping structure for stopping an end of the supporting tube.

According to another embodiment of the present invention, the bridging member and the connecting member are integrally formed.

According to another embodiment of the present invention, the connecting member is riveted to the holder.

According to another embodiment of the present invention, an antenna device includes a holder, a supporting tube and a bridging mechanism. The supporting tube is for supporting the holder. The bridging mechanism includes at least one positioning portion, a bridging member, a connecting member, a handle and at least one positioning structure. The at least one positioning portion is formed on the supporting tube. The bridging member is for bridging the supporting tube. The handle is pivoted to the bridging member for rotably pressing the supporting tube when the supporting tube is bridged to the bridging member, so as to abut the supporting tube against the bridging member. The at least one positioning structure is formed on the handle, and the at least one positioning structure simultaneously rotates with the handle for wedging with the at least one positioning portion when the handle rotates to press the supporting tube, so as to position the bridging member on the supporting tube.

In summary, the bridging mechanism of the present invention integrates the pressing cam and positioning structures on the same structure, i.e. on the handle. In other words, the handle of the bridging mechanism of the present invention includes the pressing cam for pressing the supporting tube on the bridging member and the positioning structures for positioning the supporting tube on the bridging member. When the supporting tube is desired to be fixed on the bridging member, it is only required to rotate the handle to make the pressing cam press the supporting tube on the bridging member. In such a manner, the supporting tube can be fixed on the bridging member. Furthermore, the positioning structures of the present invention can cooperate with the positioning portions on the supporting tube, so as to further position the bridging member on the supporting tube for achieving positioning effect. When the supporting tube is desired to be detached from the bridging member, it is only required to rotate the handle reversely to make the pressing cam and the positioning structures separate from the supporting tube and the positioning portions. In such a manner, the supporting tube can be detached from the bridging member. As mentioned above, the bridging member of the bridging mechanism of the present invention can be bridged and fixed on the supporting tube by rotation of the handle, or alternatively, the bridging member of the bridging mechanism of the present invention can be detached from the supporting tube by reverse rotation of the handle. It does not require additional components such as screws and results in simple assembly process, and thus it is convenient for a user to install and use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
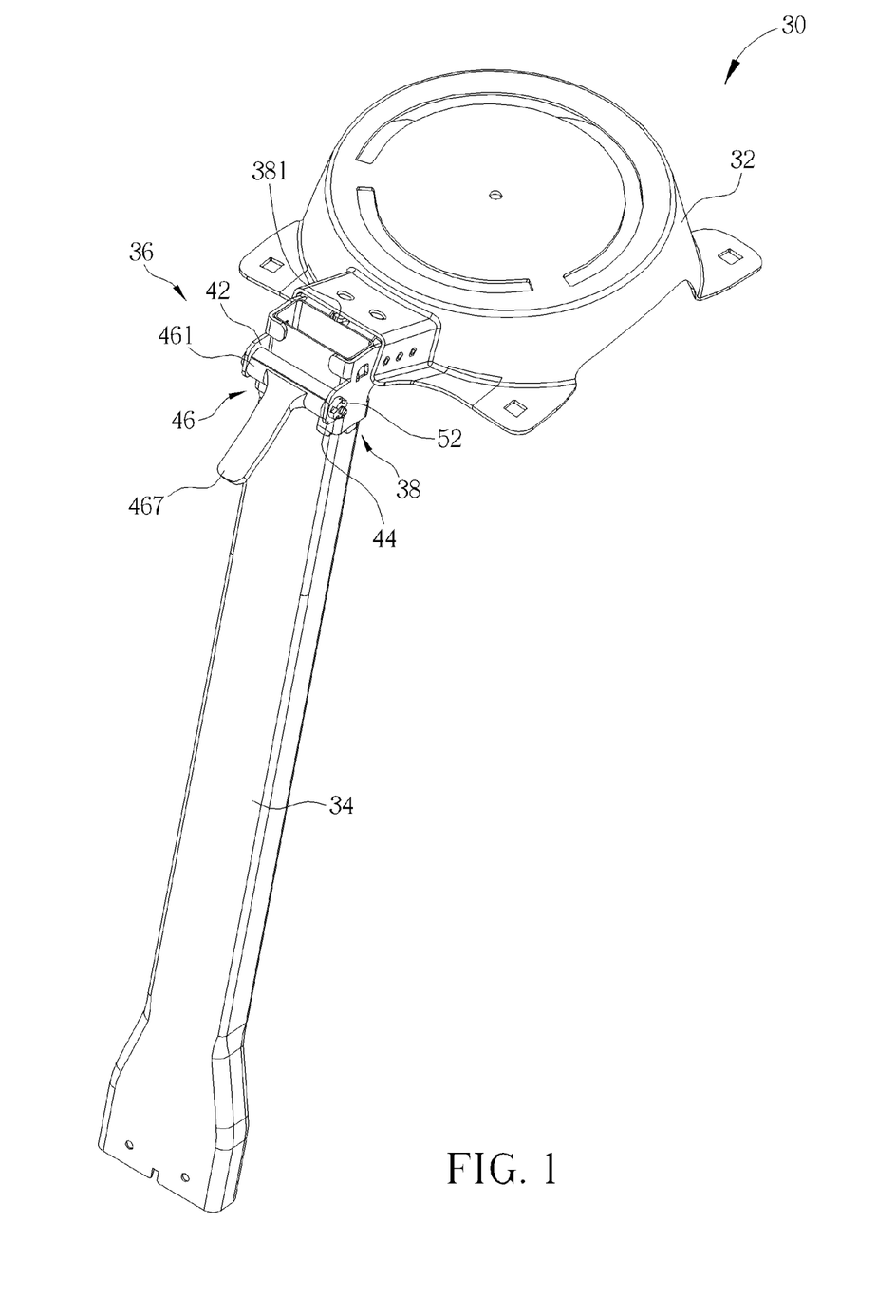
FIG. 1 is a schematic diagram of an antenna device according to an embodiment of the present invention.

Please refer to FIG. 1. FIG. 1 is a schematic diagram of an antenna device 30 according to an embodiment of the present invention. As shown in FIG. 1, the antenna device 30 includes a holder 32, a supporting tube 34 and a bridging mechanism 36. The supporting tube 34 is used for supporting the holder 32. In this embodiment, the supporting tube 34 is a satellite antenna stand, and the holder 32 is used for holding a satellite antenna disk, not shown in figures. Additionally, the bridging mechanism 36 is used for connecting the holder 32 and the supporting tube 34, such that the satellite antenna disk is disposed on the supporting tube 34 by the holder 32. In such a manner, the satellite antenna disk can be disposed on a fixing plane, such as a ground, for receiving satellite signals. It should be noticed that implementation of the bridging mechanism 36 is not limited to those mentioned in this embodiment. For example, the bridging mechanism 36 can be used for connecting a supporting tube and a light body adapted to a traffic light device. In other words, implementations for connecting a tube structure and a disk structure are within the scope of the present invention.

Figure 2:
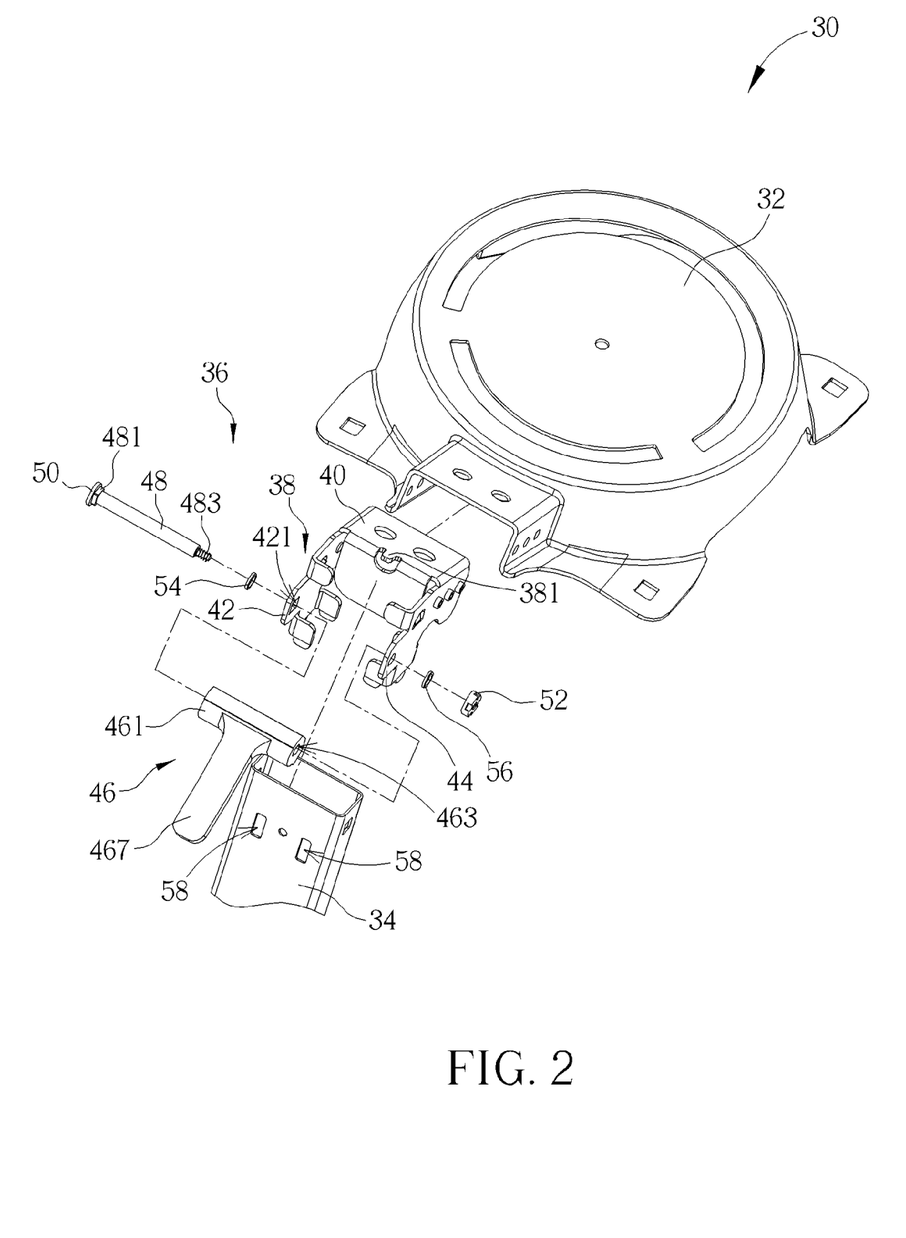
FIG. 2 is an exploded diagram of the antenna device according to the embodiment of the present invention.
Figure 3:
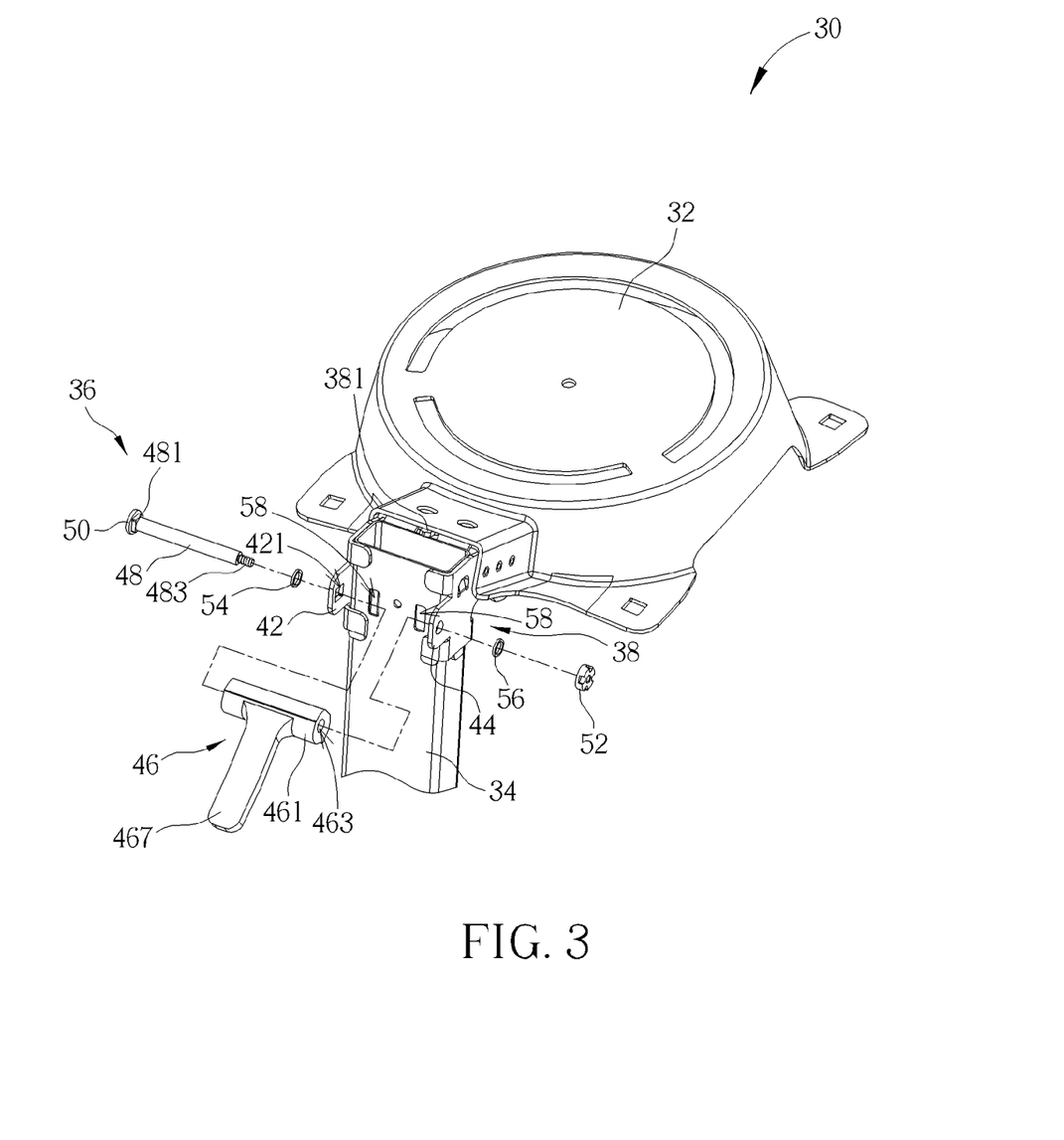
FIG. 3 is a partly exploded diagram of the antenna device according to the embodiment of the present invention.

Please refer to FIG. 2 and FIG. 3. FIG. 2 is an exploded diagram of the antenna device 30 according to the embodiment of the present invention. FIG. 3 is a partly exploded diagram of the antenna device 30 according to the embodiment of the present invention. As shown in FIG. 2 and FIG. 3, the bridging mechanism 36 includes a bridging member 38 for bridging the supporting tube 34. In this embodiment, the bridging member 38 is a substantially rectangular structure, i.e. the supporting tube 34 is a substantially rectangular tube corresponding to the rectangular structure. Structural designs of the bridging member 38 of the bridging mechanism 36 are not limited to those mentioned in this embodiment. For example, the bridging member 38 can be a substantially circular structure as well, and the supporting tube 34 can be a substantially circular tube corresponding to the circular structure. As for which one of the aforesaid designs is adopted, it depends on practical demands.

In addition, the bridging mechanism 36 further includes a connecting member 40 extending from the bridging member 38 for connecting the holder 32. In this embodiment, the connecting member 40 of the bridging mechanism 36 is, but not limited to, riveted to the holder 32. For example, the connecting member 40 of the bridging mechanism 36 can be screwed or welded to the holder 32 as well. As for which one of the aforesaid designs is adopted, it depends on practical demands. In addition, an orientation of the connecting member 40 is substantially perpendicular to an orientation of the bridging member 38. When the holder 32 and the supporting tube 34 are respectively bridged by the connecting member 40 and the bridging member 38, an orientation of the holder 32 can be substantially perpendicular to an orientation of the supporting tube 34. Orientations of the connecting member 40 and the bridging member 38 are not limited to those mentioned in this embodiment, and it depends on practical demands. In this embodiment, the bridging member 38 and the connecting member 40 are integrally formed in a stamping manner.

Figure 4:
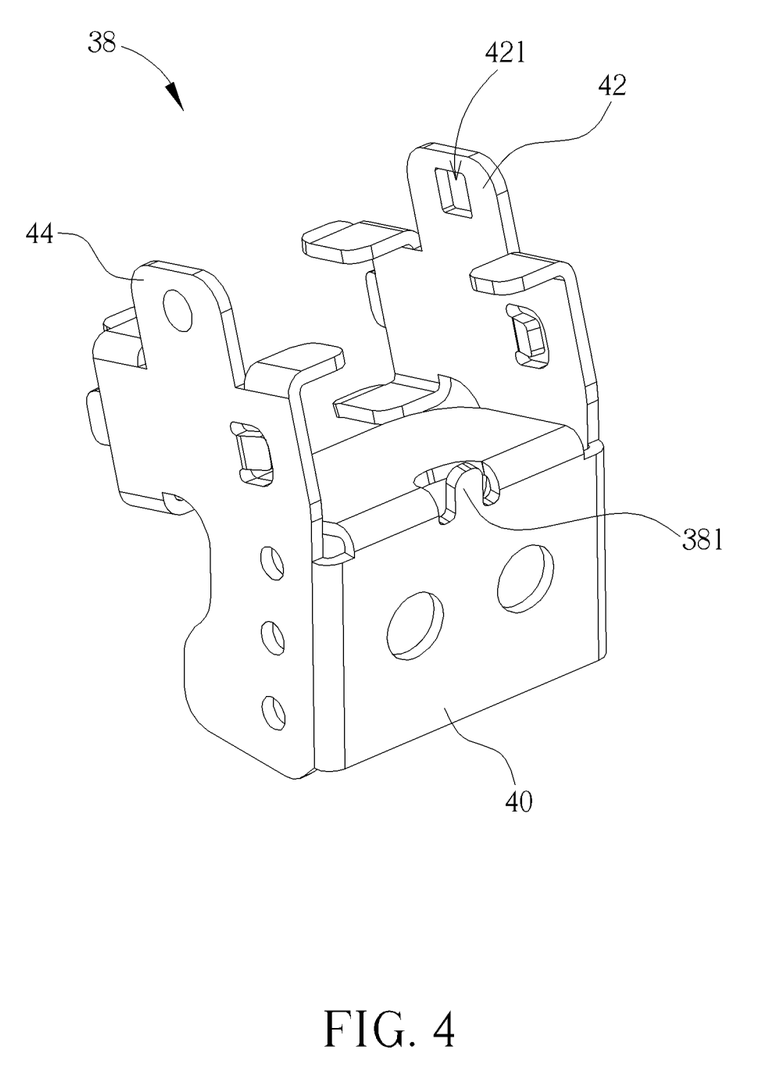
FIG. 4 is a diagram of a bridging member and a connecting member according to the embodiment of the present invention.
Figure 5:
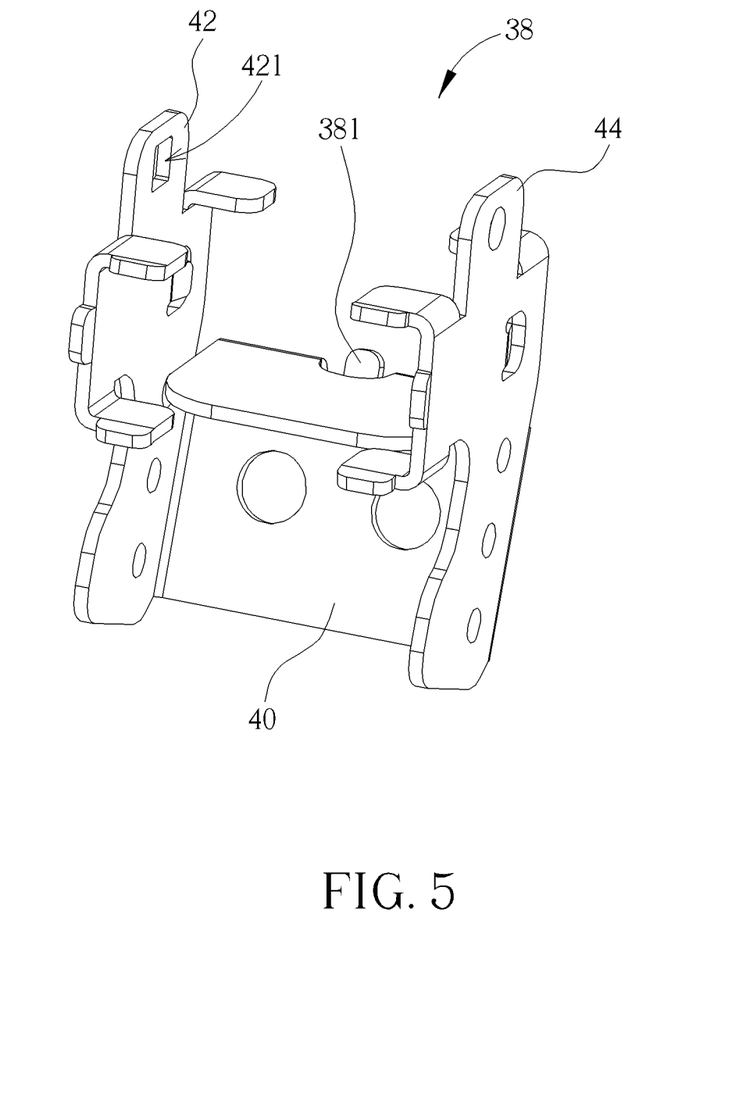
FIG. 5 is a diagram of the bridging member and the connecting member in another view according to the embodiment of the present invention.

Please refer to FIG. 2 to FIG. 5. FIG. 4 is a diagram of the bridging member 38 and the connecting member 40 according to the embodiment of the present invention. FIG. 5 is a diagram of the bridging member 38 and the connecting member 40 in another view according to the embodiment of the present invention. As shown in FIG. 2 to FIG. 5, the bridging member 38 includes a stopping structure 381. When the supporting tube 34 and the bridging member 38 of the bridging mechanism 36 are assembled, the supporting tube 34 is inserted into a space surrounded by the bridging member 38 first, and then the supporting tube 34 is moved along the bridging member 38 until an end of the supporting tube 34 abuts against the stopping structure 381 of the bridging member 38. In other words, the stopping structure 381 of the bridging member 38 is used for stopping the end of the supporting tube 34, so as to achieve positioning effect in advance during assembly.

In this embodiment, the bridging member 38 of the present invention includes one stopping structure 381 located in a position corresponding a central axis of the supporting tube 34. An amount and disposal positions are not limited to those mentioned in this embodiment. For example, the bridging member 38 of the present invention can include two stopping structures 381 located in a position corresponding to two sides of the supporting tube 34. In other words, structure of more than one stopping structure 381 is within the scope of the present invention.

As shown in FIG. 1 to FIG. 5, the bridging member 38 includes a first edge plate 42 and a second edge plate 44 opposite to the first edge plate 42. The first edge plate 42 is connected to an edge of the bridging member 38, and the second edge plate 44 is connected to another edge of the bridging member 38. In this embodiment, the bridging member 38, the connecting member 40, the first edge plate 42 and the second edge plate 44 are, but not limited to, integrally formed in a stamping manner. In other words, the bridging member 38, the connecting member 40, the first edge plate 42 and the second edge plate 44 can be separate members as well, and the bridging member 38, the connecting member 40, the first edge plate 42 and the second edge plate 44 can be integrally formed in a welding manner. As for which one of the aforesaid designs is adopted, it depends on practical demands.

In addition, the bridging mechanism 36 further includes a handle 46 and a pivot shaft member 48. Furthermore, the handle 46 includes a pivotal portion 461, and a pivotal hole 463 is formed on the pivotal portion 461. When the handle 46 and the bridging member 38 are installed, the pivotal portion 461 of the handle 46 is disposed inside the space surrounded by the bridging member 38 first, and then the pivot shaft member 48 is sequentially disposed through the first edge plate 42, the pivotal hole 463 on the pivotal portion 461 of the handle 46 and the second edge plate 44. In such a manner, the pivotal portion 461 of the handle 46 is pivoted to the first edge plate 42 and the second edge plate 44 of the bridging member 38. In other words, the pivot shaft member 48 is used for pivoting the pivotal portion 461 of the handle 46 to the first edge plate 42 and the second edge plate 44 of the bridging member 38, such that the handle 46 is pivoted to the bridging member 38.

Figure 6:
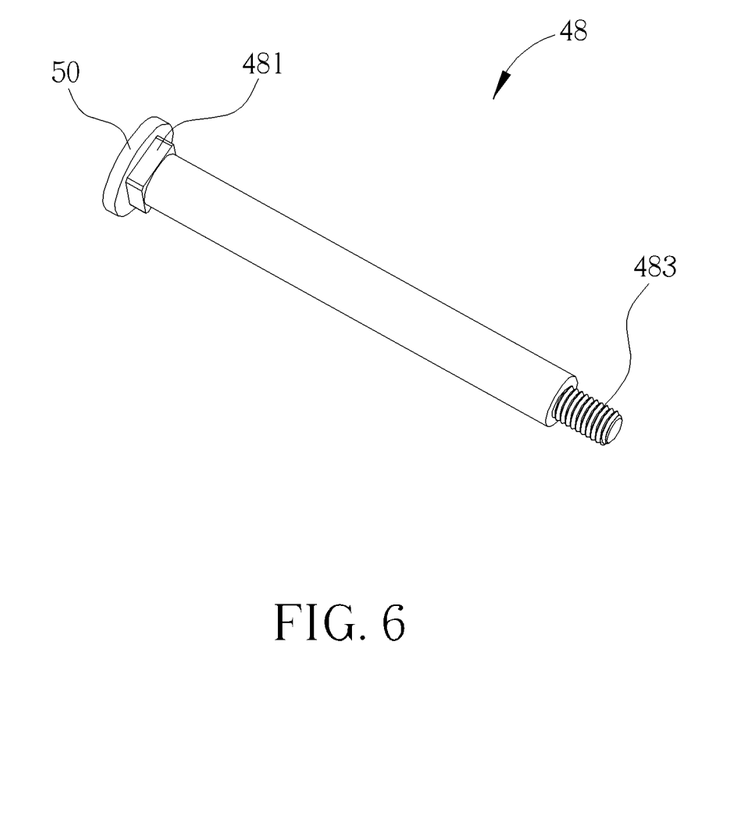
FIG. 6 is a diagram of a pivot shaft member according to the embodiment of the present invention.

Please refer to FIG. 1 to FIG. 6. FIG. 6 is a diagram of the pivot shaft member 48 according to the embodiment of the present invention. As shown in FIG. 1 to FIG. 6, a constraining hole 421 is formed on the first edge plate 42 of the bridging member 38, and a constraining structure 481 is formed on an end of the pivot shaft member 48. In this embodiment, the constraining structure 481 on the pivot shaft member 48 is a substantially rectangular structure, and the constraining hole 421 on the first edge plate 42 is a substantially rectangular hole. When the pivot shaft member 48 is disposed through the first edge plate 42, the pivotal hole 463 on the pivotal portion 461 of the handle 46 and the second edge plate 44, the constraining structure 481, i.e. the rectangular structure, of the pivot shaft member 48 is used for cooperating with the constraining hole 421, i.e. the rectangular hole, on the first edge plate 42, so as to constrain the pivot shaft member 48 from rotating relative to the first edge plate 42 and the second edge plate 44. In other words, the constraining structure 481, i.e. the rectangular structure, is used for cooperating with the constraining hole 421, i.e. the rectangular hole, so as to constrain the pivot shaft member 48 from rotating relative to the bridging member 38. Structures of the constraining structure 481 and the constraining hole 421 are not limited to those mentioned in this embodiment. For example, the constraining structure 481 and the constraining hole 421 can be respectively a D-shaped structure and a D-shaped hole as well. In other words, structures capable of constraining the pivot shaft member 48 from rotating relative to the bridging member 38 are within the scope of the present invention.

As shown in FIG. 1 to FIG. 6, the bridging mechanism 36 further includes a first constraining member 50 and a second constraining member 52. When the pivotal portion 461 of the handle 46 is pivoted to the bridging member 38 by the pivot shaft member 48, the first constraining member 50 on an end of the pivot shaft member 48 and the pivot shaft member 48 are moved toward the first edge plate 42, until the first constraining member 50 abuts against the first edge plate 42. Then, the second constraining member 52 is disposed on other end of the pivot shaft member 48, and the second constraining member 52 is moved toward the second edge plate 44 along the pivot shaft member 48, until the second constraining member 52 abuts against the second edge plate 44. In the meantime, the first constraining member 50 and the second constraining member 52 are disposed on different sides of the first edge plate 42 and the second edge plate 44, and the first constraining member 50 and the second constraining member 52 abut against the first edge plate 42 and the second edge plate 44, respectively, so as to fix the pivot shaft member 48 on the bridging member 38. In other words, the first constraining member 50 and the second constraining member 52 are cooperatively used for preventing the pivot shaft member 48 from separating from the bridging member 38.

In this embodiment, the first constraining member 50 and the pivot shaft member 48 are integrally formed. In practical application, the pivot shaft member 48 and the first constraining member 50 can be, but not limited to, a thread body portion and a nut portion of a screw component. For example, the pivot shaft member 48 and the first constraining member 50 can be respectively a screw portion and a riveting structure on the screw portion as well. As for which one of the aforesaid designs is adopted, it depends on practical demands. In addition, a thread portion 483 is formed on the other end of the pivot shaft member 48, and the second constraining member 52 is a nut.

As mentioned above, the nut, i.e. the second constraining member 52, can movably sheathe on the thread portion 483 on the other end of the pivot shaft member 48, so as to complete the installation of the handle 46 and the bridging member 38 and further fix the pivot shaft member 48 on the bridging member 38. Structural designs of the first constraining member 50 and the second constraining member 52 are not limited to those mentioned in this embodiment. For example, the first constraining member 50 and the second constraining member 52 can be respectively a C-ring. The first constraining member 50, i.e. the C-ring, is latched on the end of the pivot shaft member 48, and the second constraining member 52, i.e. the C-ring, is latched on the other end of the pivot shaft member 48 during assembly, so as to fix the pivot shaft member 48 on the bridging member 38. As for which one of the aforesaid designs is adopted, it depends on practical demands.

In addition, the bridging mechanism 36 can further include a first bushing 54 and a second bushing 56. The first bushing 54 sheathes on the pivot shaft member 48. When the handle 46 is installed on the bridging member 38, the first bushing 54 abuts against the pivotal portion 461 of the handle 46 and the first edge plate 42 of the bridging member 38, respectively. The second bushing 56 sheathes on the pivot shaft member 48. When the handle 46 is installed on the bridging member 38, the second bushing 56 abuts against the pivotal portion 461 of the handle 46 and the second edge plate 44 of the bridging member 38, respectively. In this embodiment, the first bushing 54 and the second bushing 56 are made of flexible materials, such as rubber materials. Accordingly, when the handle 46 pivots relative to the bridging member 38, the first bushing 54 can prevent the pivotal portion 461 of the handle 46 from directly rubbing against the first edge plate 42 of the bridging member 38, and the second bushing 56 can prevent the pivotal portion 461 of the handle 46 from directly rubbing against the second edge plate 44 of the bridging member 38. In other words, the first bushing 54 and the second bushing 56 can be used for enhancing life of the handle 46 and the bridging member 38.

Figure 7:
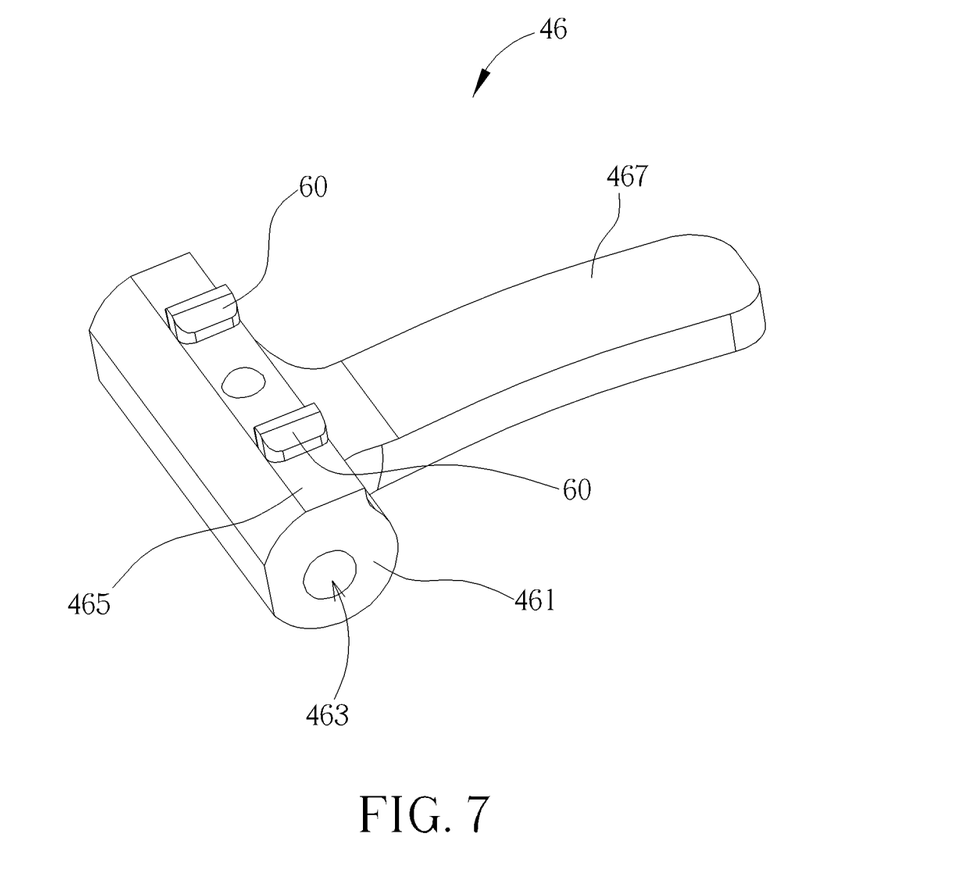
FIG. 7 is a diagram of a handle according to the embodiment of the present invention.

Please refer to FIG. 1 to FIG. 7. FIG. 7 is a diagram of the handle 46 according to the embodiment of the present invention. As shown in FIG. 1 to FIG. 7, the bridging mechanism 36 further includes two positioning portions 58 and two positioning structures 60. The positioning portions 58 are formed on the supporting tube 34 and located in positions near two sides of the supporting tube 34. The positioning structures 60 are formed on the handle 46 and located in positions corresponding to the positioning structures 60. The positioning structures 60 are capable of simultaneously rotating with the handle 46 for wedging with the positioning portions 58 on the supporting tube 34, so as to position the bridging member 38 on the supporting tube 34. Amounts and disposal positions are not limited to those mentioned in this embodiment. For example, the bridging mechanism 36 can include one positioning portion 58 and one positioning structure 60. The positioning portion 58 is formed on the supporting tube 34 and located in a central position, and the positioning structure 60 is formed on the handle 46 and located in a position corresponding to the positioning portion 58. In other words, structural designs with more than one positioning portion 58 and more than one positioning structure 60 are within the scope of the present invention. In this embodiment, the positioning portion 58 is a positioning hole, and the positioning structure 60 is a positioning post.

Figure 8:
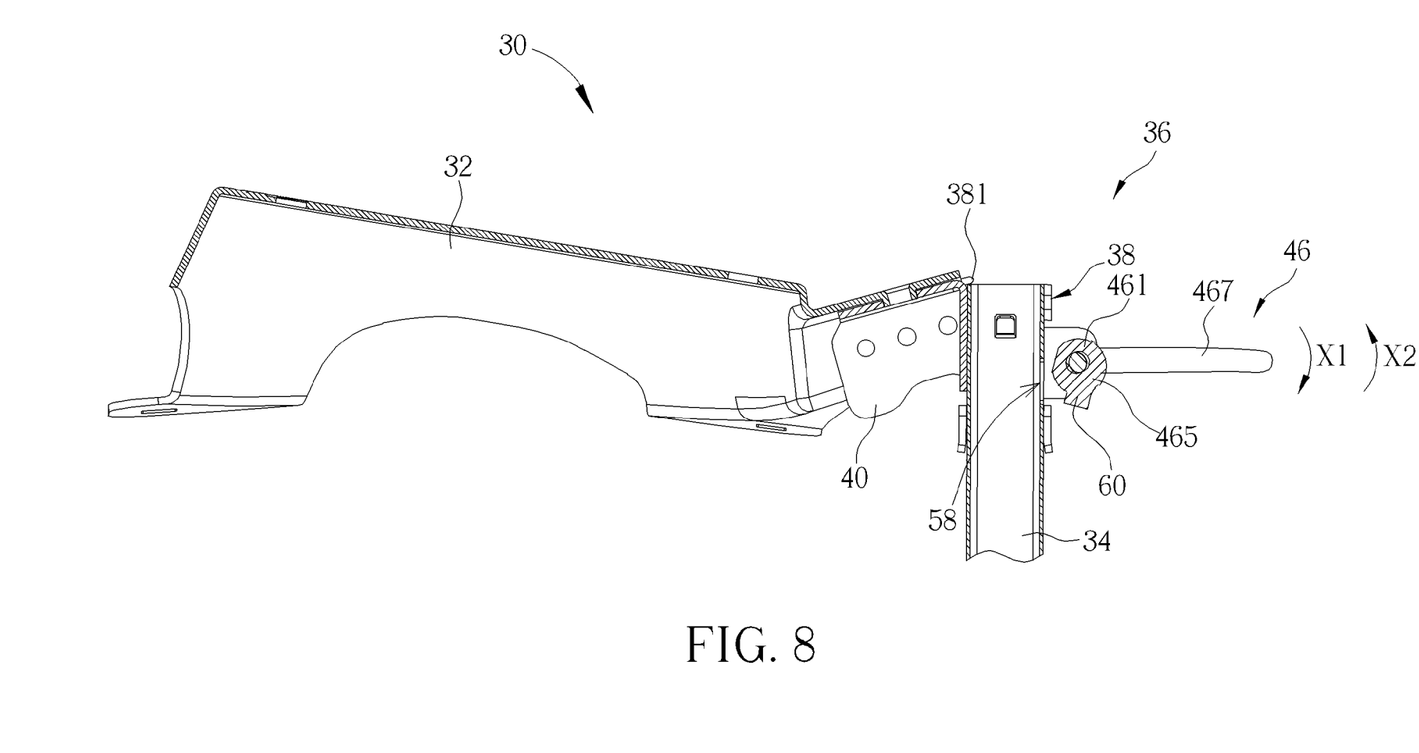
FIG. 8 is a diagram of a bridging mechanism in a released status according to the embodiment of the present invention.
Figure 9:
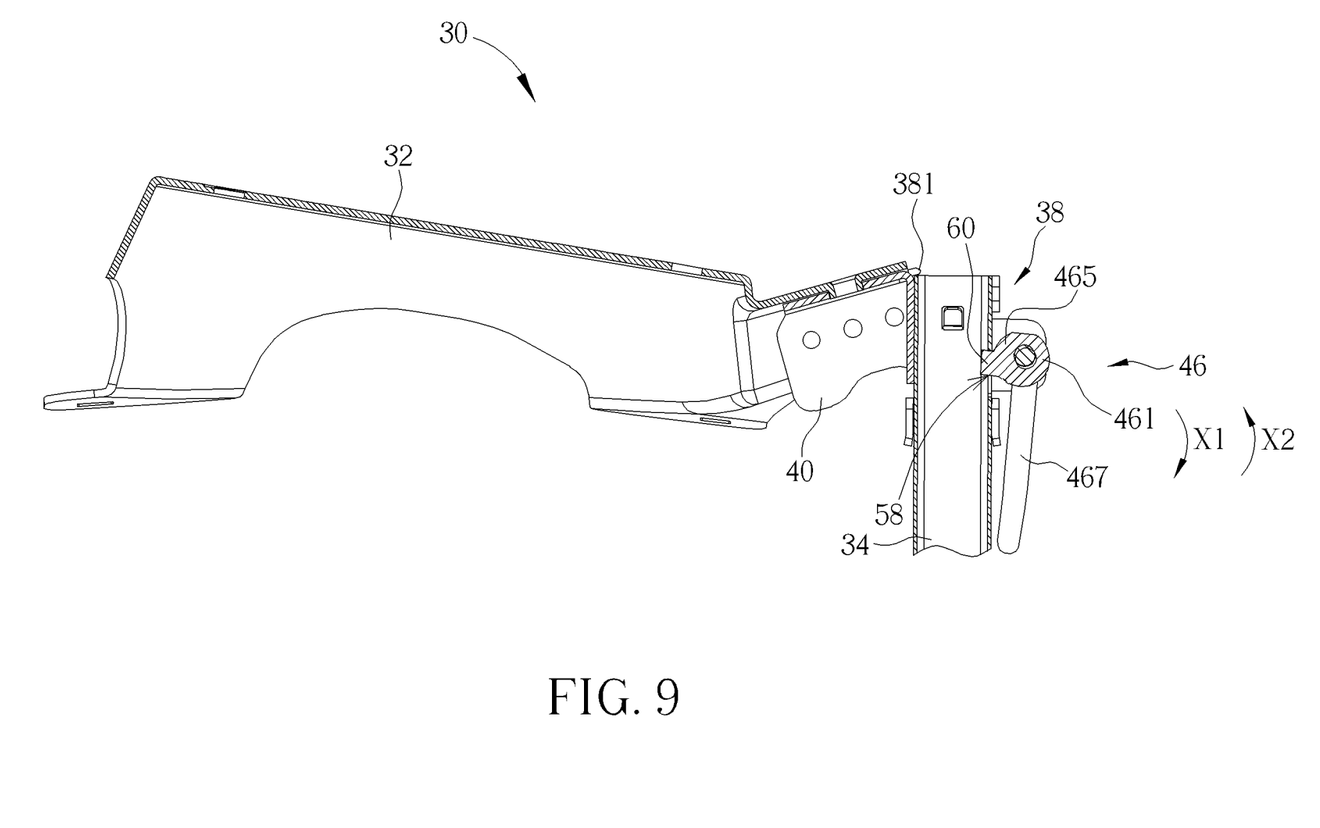
FIG. 9 is a diagram of the bridging mechanism in a wedged status according to the embodiment of the present invention.

In addition, the handle 46 further includes a pressing cam 465 and a handle portion 467. The pressing cam 465 protrudes from the pivotal portion 461, and the handle portion 467 is connected to the pivotal portion 461. Please refer to FIG. 8 and FIG. 9. FIG. 8 is a diagram of the bridging mechanism 36 in a released status according to the embodiment of the present invention. FIG. 9 is a diagram of the bridging mechanism 36 in a wedged status according to the embodiment of the present invention. As shown in FIG. 8 and FIG. 9, after the handle 46 is installed on the bridging member 38 and the connecting member 40 is connected to the holder 32, the supporting tube 34 can be further inserted into the space surrounded by the bridging member 38. Then, the supporting tube 34 is pushed along the bridging member 38 until the end of the supporting tube 34 abuts against the stopping structure 381 of the bridging member 38. Meanwhile, the bridging member 38 can be bridged to the supporting tube 34, as shown in FIG. 8.

In the meantime, the handle portion 467 of the handle 46 can be rotated in a first direction X1 shown in FIG. 8, such that the pivotal portion 461 and the pressing cam 465 are driven by the handle portion 467 to rotate in the first direction X1. When the handle 46 is rotated in the first direction X1 from a released position in FIG. 8, the pressing cam 465 of the handle 46 rotates with the pivotal portion 461 and approaches the supporting tube 34. When the pressing cam 465 of the handle 46 is rotated in the first direction X1 from the released position in FIG. 8 to a wedged position in FIG. 9, the pressing cam 465 of the handle 46 can press the supporting tube 34 to make the supporting tube 34 abut against the bridging member 38. In such a manner, the supporting tube 34 can be fixed on the bridging member 38 by rotation of the pressing cam 465, so as to prevent the supporting tube 34 from separating from the bridging member 38.

In addition, when the handle 46 is rotated in the first direction X1 from the released position in FIG. 8 to the wedged position in FIG. 9, the positioning structures 60 can rotate with the handle 46 since the positioning structures 60 are formed on the handle 46. Furthermore, when the handle 46 is rotated in the first direction X1 to the wedged position in FIG. 9, the positioning structures 60 simultaneously rotate with the handle 46 for wedging the positioning portions 58 on the supporting tube 34, so as to position the bridging member 38 on the supporting tube 34.

In summary, the bridging mechanism 36 of the present invention utilizes a design that the positioning structures 60 is capable of simultaneously rotating with the handle 46, so as to make the positioning structures 60 wedge with the positioning portions 58 on the supporting tube 34 when the handle 46 is rotated. Accordingly, the bridging member 38 of the bridging mechanism 36 can be positioned on the supporting tube 34. Furthermore, since the connecting member 40 of the bridging mechanism 36 is connected to the holder 32, the satellite antenna disk held by the holder 32 can be further positioned by the bridging mechanism 36 of the present invention, such that the satellite antenna disk can receive the satellite signals more efficiently.

When the supporting tube 34 is desired to be detached from the bridging member 38 of the bridging mechanism 36, it is only required to rotate the handle portion 467 of the handle 46 in a second direction X2 opposite to the first direction X1, as shown in FIG. 9. Accordingly, the pivotal portion 461 and the pressing cam 465 can be rotated by the handle portion 467 in the second direction X2. When the handle 46 is rotated in the second direction X2 from the wedged position in FIG. 9, the pressing cam 465 and the positioning structures 60 can rotate with the pivotal portion 461 in the second direction X2 to gradually separate from the supporting tube 34 and the positioning portions 58. When the handle 46 is rotated in the second direction X2 from the wedged position in FIG. 9 to the released position in FIG. 8, the pressing cam 465 and the positioning structures 60 separate from the positioning portions 58 on the supporting tube 34. In such a manner, the supporting tube 34 can be detached from the bridging member 38 of the bridging mechanism 36.

Compared to the prior art, the bridging mechanism of the present invention integrates the pressing cam and positioning structures on the same structure, i.e. on the handle. In other words, the handle of the bridging mechanism of the present invention includes the pressing cam for pressing the supporting tube on the bridging member and the positioning structures for positioning the supporting tube on the bridging member. When the supporting tube is desired to be fixed on the bridging member, it is only required to rotate the handle to make the pressing cam press the supporting tube on the bridging member. In such a manner, the supporting tube can be fixed on the bridging member. Furthermore, the positioning structures of the present invention can cooperate with the positioning portions on the supporting tube, so as to further position the bridging member on the supporting tube for achieving positioning effect. When the supporting tube is desired to be detached from the bridging member, it is only required to rotate the handle reversely to make the pressing cam and the positioning structures separate from the supporting tube and the positioning portions. In such a manner, the supporting tube can be detached from the bridging member. As mentioned above, the bridging member of the bridging mechanism of the present invention can be bridged and fixed on the supporting tube by rotation of the handle, or alternatively, the bridging member of the bridging mechanism of the present invention can be detached from the supporting tube by reverse rotation of the handle. It does not require additional components such as screws and results in simple assembly process, and thus it is convenient for a user to install and use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridging mechanism for connecting a supporting tube and a holder, comprising:
    at least one positioning portion formed on the supporting tube;
    a bridging member for bridging the supporting tube, the bridging member comprising a first edge plate and a second edge plate opposite to the first edge plate;
    a connecting member extending from the bridging member for connecting the holder;
    a handle pivoted to the bridging member for rotably pressing the supporting tube when the supporting tube is bridged to the bridging member, so as to abut the supporting tube against the bridging member, the handle comprising a pivotal portion and a pressing cam protruding from the pivotal portion, the pressing cam having a pressing platform pressing the supporting tube in a surface contact manner, and a pivotal hole and a flat surface being formed on the pivotal portion;
    at least one positioning structure formed on the pressing cam and protruding from the pressing platform, the at least one positioning structure simultaneously rotating with the pressing cam for wedging with the at least one positioning portion when the pressing cam rotates to press the supporting tube, so as to position the bridging member on the supporting tube; and
    a pivot shaft member disposed through the pivotal hole on the pivotal portion for pivoting the pivotal portion to the first edge plate and the second edge plate, wherein the pivot shaft member is supported by the first edge plate and the second edge plate;
    wherein a constraining hole is formed on the first edge plate of the bridging member, and a constraining structure with a shape corresponding to a shape of the constraining hole is formed on an end of the pivot shaft member, the constraining structure being for cooperating with the constraining hole, so as to constrain the pivot shaft member from rotating relative to the bridging member, the flat surface is spaced from the bridging member for facilitating the handle to rotate from a release position in a first direction.

2. The bridging mechanism of claim 1, wherein the handle comprises:
    a handle portion connected to the pivotal portion, the handle portion being for rotating the pivotal portion to make the pressing cam press the supporting tube when the bridging member bridges the supporting tube.

3. The bridging mechanism of claim 1, wherein the constraining structure is a substantially rectangular structure, and the constraining hole is a substantially rectangular hole.

4. The bridging mechanism of claim 1, further comprising:
    a first constraining member disposed on an end of the pivot shaft member for abutting against the first edge plate of the bridging member; and
    a second constraining member disposed on the other end of the pivot shaft member for abutting against the second edge plate, the second constraining member and the first constraining member being cooperatively further for constraining the pivot shaft member from being separate from the bridging member.

5. The bridging mechanism of claim 4, wherein the first constraining member and the pivot shaft member are integrally formed, a thread portion is formed on the other end of the pivot shaft member, and the second constraining member is a nut movably screwed on the thread portion.

6. The bridging mechanism of claim 1, further comprising:
    a first bushing sheathing on the pivot shaft member and located on exterior of the pivotal portion, the first bushing abutting against the pivotal portion of the handle and the first edge plate of the bridging member; and
    a second bushing sheathing on the pivot shaft member and located on exterior of the pivotal portion, the second bushing abutting against the pivotal portion of the handle and the second edge plate of the bridging member.

7. The bridging mechanism of claim 1, wherein the at least one positioning portion is a positioning hole, and the at least one positioning structure is a positioning post.

8. The bridging mechanism of claim 1, wherein the bridging member is a substantially rectangular structure.

9. The bridging mechanism of claim 1, wherein the bridging member comprises a stopping structure for stopping an end of the supporting tube.

10. The bridging mechanism of claim 1, wherein the bridging member and the connecting member are integrally formed.

11. The bridging mechanism of claim 1, wherein the connecting member is riveted to the holder.

* * * * *